United States Patent [19]

Dye

[11] Patent Number: 5,112,284
[45] Date of Patent: May 12, 1992

[54] ROCKER-MOUNTING FOR DIFFERENTIAL GEAR

[75] Inventor: James S. Dye, Walworth, N.Y.

[73] Assignee: Zexel-Gleason USA, Inc., Rochester, N.Y.

[21] Appl. No.: 630,050

[22] Filed: Dec. 10, 1990

[51] Int. Cl.⁵ .......................... F16H 1/30; F16H 1/38; F16H 1/48; F16H 57/00
[52] U.S. Cl. .................... 475/228; 475/227; 475/333; 475/346; 74/406; 74/409; 74/410; 74/411
[58] Field of Search ............... 475/227, 228, 333, 346; 74/410, 411, 406, 409

[56] References Cited

U.S. PATENT DOCUMENTS

| | | | |
|---|---|---|---|
| 2,382,846 | 8/1945 | Barber | 475/346 X |
| 2,859,641 | 11/1958 | Gleasman | 74/715 |
| 3,303,713 | 2/1967 | Hicks | 74/411 |
| 3,807,250 | 4/1974 | Dietzel et al. | 74/410 |
| 4,297,919 | 11/1981 | Kuehnle | 74/409 X |
| 4,491,036 | 1/1985 | Stritzel | 475/227 |
| 4,532,822 | 8/1985 | Godlewski | 74/411 X |
| 4,700,583 | 10/1987 | Hicks | 74/410 |

FOREIGN PATENT DOCUMENTS

| | | | |
|---|---|---|---|
| 3014860 | 10/1980 | Fed. Rep. of Germany | 475/333 |
| 2948936 | 6/1981 | Fed. Rep. of Germany | 475/346 |
| 2527724 | 12/1983 | France | 475/346 |

Primary Examiner—Leslie A. Braun
Assistant Examiner—David E. Henn
Attorney, Agent, or Firm—Eugene Stephens & Associates

[57] ABSTRACT

The disclosure concerns an improvement for an automotive differential having helical-worm side gears operatively connected through one or more pairs of combination gears, each combination gear having a worm-wheel portion which meshes with one or the other of the side gears and a spur-gear portion which meshes with its paired combination gear. The improvement is a cylindrical mounting arrangement for one or more of the combination gears. Preferably, a cylindrical surface on a mounting washer mates with a cooperating cylindrical surface formed in the differential housing to permit slight positional-adjustment movements of the combination gear, such adjustment movements being limited to a plane perpendicular to the axis of the side gear with which the combination gear is associated.

4 Claims, 2 Drawing Sheets

ROCKER-MOUNTING FOR DIFFERENTIAL GEAR

TECHNICAL FIELD

This invention relates to vehicle differential gear assemblies of the type for transferring and dividing torque between two axle ends operatively connected by at least one pair of combination gears. Each paired combination gear is in meshing engagement with its paired gear and, also, is in meshing engagement with a respective one of a pair of helical-worm side gears fixed to said axle ends. The invention relates specifically to the mounting of such combination gears.

BACKGROUND

A differential assembly of the type contemplated for the present invention is generally of the design shown in U.S. Pat. No. 2,859,641 (GLEASMAN). That patent is incorporated herein by reference to the extent necessary to provide specific details of the structure of the differential assembly.

This type of differential includes a rotatable gear housing, a pair of drive axles received in bores formed in the sides of the housing, and a differential gear arrangement mounted within a main body portion of the housing for driving the axles. One end of the main housing body includes a flange for mounting a ring gear or other means providing power input to the differential from the vehicle's drive shaft. The other end of the gear housing is provided with a cap which may be either formed as an integral part of the main housing body or may be removably secured to the housing.

Within this prior art differential is a gear arrangement which is referred to as a "crossed-axis compound planetary gear complex". This arrangement includes (a) a pair of helical-worm side gears coupled to each axle end, and (b) one or more so-called "transfer" gears associated with each of the side gears, the transfer gears being in mesh with each other for transferring and dividing torque between the axle ends. The transfer gears are mounted in pairs within slots, or windows, formed in the main body portion of the gear housing; and each transfer gear of a pair rotates on an axis of rotation that is substantially perpendicular to the axis of rotation of the side gears and gear housing.

The transfer gears are in reality "combination" gears, i.e., the middle portion of each gear constitutes a worm-wheel portion while the outer ends of the gear are formed with integral gear teeth of either spur or helical design, these outer ends being referred to hereinafter simply as "spur-gear" portions. The gear arrangement is such that, for each pair of combination gears: the worm-wheel portion of a first combination gear meshes with one side gear, while the worm-wheel portion of the other combination gear meshes with the other side gear, and the spur-gear portions of each of the respective combination gears mesh with each other.

The combination gears are each mounted to the gear housing body by a pin which fits into a pair of axially aligned bores in the housing. Usually, two or three pairs of combination gears are mounted in the same assembly, being positioned at equidistant spacings around the two side gears. Thus, each side gear is intermeshed with two or three combination gears, and the individual combination gears of each combination-gear pair intermesh with each other. In this manner, the driving loads between the two axles are, ideally, divided equally between the different sets of combination-gear pairs. To achieve such load balancing, considerable care is taken during manufacture of the differential assemblies to assure that all of these gears are accurately positioned relative to each other. In this regard, it is of particular importance that the spur-gear portions at the ends of each combination-gear pair be in mesh.

Nonetheless, slight positional variations do occur in both manufacture and assembly, and these can sometimes result in minor misalignments in which the combination-gear pairs are not properly meshed with their respective side gears and/or with each other. Optimally, where three pairs of combination gears are positioned about the side gears, the loads experienced by each side gear are evenly divided between the worm-wheel portions of each of its three related combination gears; and, similarly, the load experienced by the worm-wheel portion of each combination gear is shared nearly equally between its two spur-gear portions. However, the minor misalignments just mentioned above can jeopardize this optimal balancing of the side gear load and can cause sufficient load imbalance to produce undesirable wear and/or noise problems.

My invention facilitates the correction of such minor misalignments and, thereby, helps reduce such load imbalance problems.

SUMMARY OF THE INVENTION

In the invention disclosed herein, the combination gears are supported in the differential case in cylindrical mountings which allow each combination gear to be positionally adjusted very slightly by motion about an axis parallel to the common axis of the side gear and axle with which the combination gear is associated. In the preferred embodiment, the axis for this motion is located near the center of each combination gear. However, this may not be appropriate for all designs, and the cylindrical mountings at the two ends of a combination gear may be on different individual centers. Of course, in such designs, additional clearance must be allowed between the housing and the gear ends. As the radius of curvature for this adjustment motion is made smaller, the "sensitivity" of the adjustment increases, i.e., smaller motions having greater effect on the relative position of the gears.

Although this possible adjustment motion is very slight, it is enough to adjust the meshing contact between the combination gears and their respective side gears, and between the spur-gear portions of each combination-gear pair to improve load sharing in spite of minor positional variations which may occur during manufacture and assembly. Further, by limiting this positional adjustment of each combination gear to a plane perpendicular to the axis of its associated side gear, the adjustment motion does not have any deleterious effect on the contact pattern between the worm-wheel portion of the combination gear and the worm teeth of the side gear.

DRAWINGS

DETAILED DESCRIPTION OF THE PREFERRED EMBODIMENT

Figure 1:
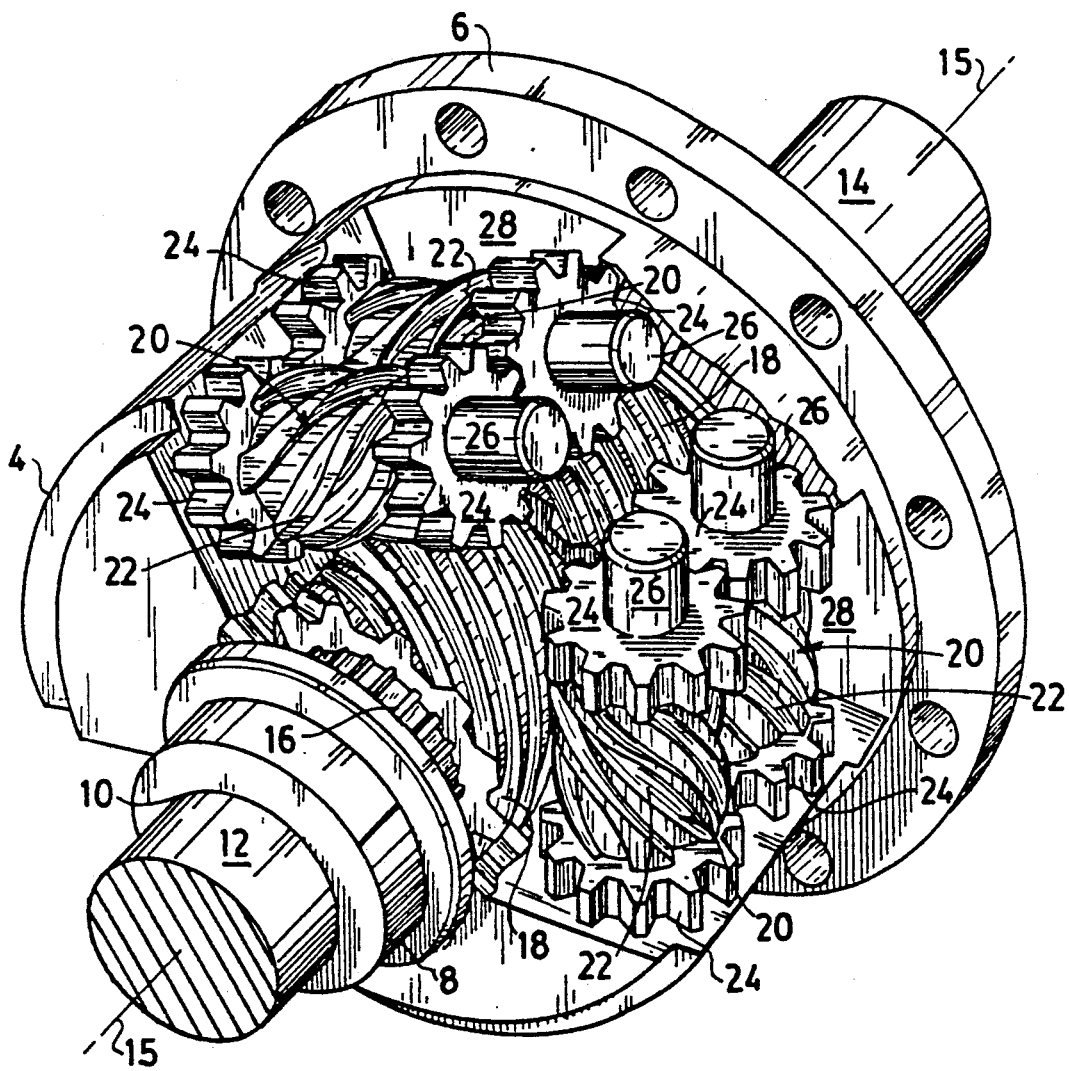
FIG. 1 is a perspective view of a prior art differential gear assembly of the type being improved by the present invention, parts of the assembly being broken away to reveal the internal gear structure.

Referring to FIG. 1, a known differential gear assembly generally similar to the differential gear assembly of this invention includes a differential gear housing 4 with a flange 6 at one end. The flange 6 is adapted to mount a ring gear (not shown) for receiving power input from the drive train of a vehicle in a conventional manner. The differential housing 4 also includes a pair of spaced apart trunnions 8 (only one of which is shown) which are adapted to receive bearings by which the differential gear housing is rotatably mounted inside a conventional axle housing.

The differential gear housing 4 also includes a pair of axle-receiving bores 10 (only one of which is shown) which are at least partially defined by the trunnions 8 and through which axle shaft ends 12, 14 extend into engagement with the differential gear assembly inside the housing. In particular, axle shaft ends 12, 14 include external splines 16 which engage mating internal splines of helical-worm gears 18, 18', respectively. These worm gears are hereinafter referred to as side gears.

Each side gear 18 or 18' meshes with three transfer or combination gears 20 which are arranged at 120° intervals about the periphery of the side gear and which are arranged generally tangentially to, and engaged with, the pitch surface of the side gear. It is understood with reference to FIG. 1 that only two of the three transfer gears associated with each side gear 18 or 18' are shown. Each of these transfer gears, hereinafter referred to as combination gears, is formed with a middle portion which constitutes an hourglass-shaped worm-wheel portion 22 and integral end portions which constitute spur-gear portions 24. It will be appreciated that each side gear meshes with the respective worm-wheel portions of its three associated combination gears 20. The combination gears are paired so that, at the same time, the spur-gear portions 24 of each combination gear associated with one side gear are in mesh with the spur-gear portions of an adjacent (i.e., paired) combination gear associated with the other of the two side gears. By this arrangement, torque is both transferred and divided between axle shaft ends 12, 14.

Each combination gear 20 is mounted for rotation about a shaft 26, the ends of which extend beyond the gear and serve to mount the gear within housing 4. Since each of the three combination gears 20 associated with one side gear 18 is paired with a combination gear associated with the other side gear, housing 4 is formed with three peripherally arranged "windows" or slots 28 extending radially inwardly from the periphery of housing 4, each window or slot 28 receiving and mounting one pair of combination gears.

Figure 2:
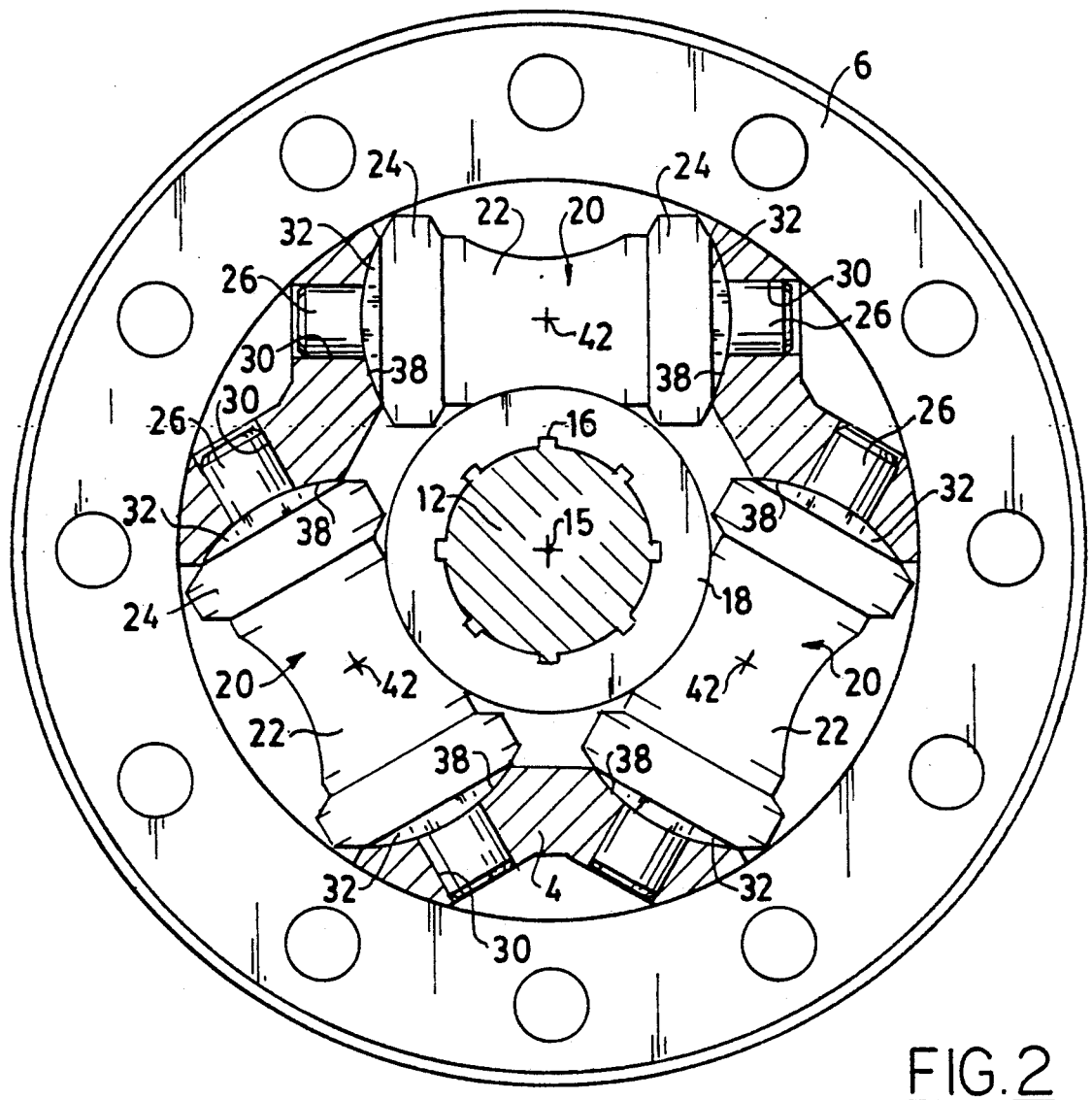
FIG. 2 is a schematic and partially sectional view of a differential gear assembly similar to that shown in FIG. 1 but modified in accordance with the invention, the view being generally in a plane perpendicular to the axis of the side gears and axles.

Reference is now made to FIG. 2 which is a schematic and partially sectional view of a differential gear assembly modified in accordance with the invention. This modified assembly is similar to that shown in FIG. 1, and the view is generally in a plane perpendicular to the axis of the side gears and axles. The three combination gears 20 that mesh with side gear 18 are shown schematically, each being mounted for rotation on a respective shaft 26 which, in turn, is held in position by being received in a respective bore 30 formed in housing 4.

Figure 3:
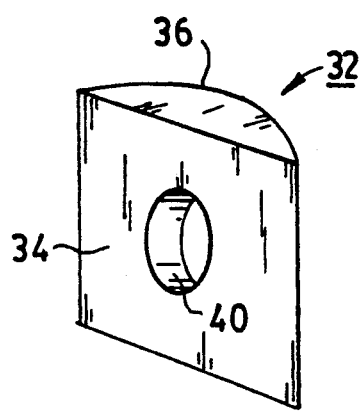
FIG. 3 is a perspective view of one of the invention's mounting washers shown in FIG. 2.

A cylindrical washer 32 is located at each of the outer ends of each combination gear 20. As can best be seen in a perspective view illustrated in FIG. 3, each washer 32 has a plane surface 34, which contacts an end surface of combination gear 20, and a cylindrical surface 36, which contacts a mating cylindrical surface 38 formed in housing 4. Each washer 32 also has a centrally located bore 40 through which passes shaft 26 of its related combination gear 20.

Each pair of cylindrical housing surfaces 38 associated with each respective combination gear 20, has a respective axis of generation 42 located at or near the center of each respective combination gear 20. Each axis 42 lies in a plane shared with the common axis 15 of both axle shaft end 12 and side gear 18. The cylindrical surfaces 36 of washers 32 are designed for mating cooperation with cylindrical housing surfaces 38.

A similar mounting arrangement (not shown) is repeated for the three combination gears 20 associated with side gear 18', and the cylindrical surfaces just described above are intended to allow each combination gear 20 to adjust its position under load relative to its paired combination gear. It will be appreciated that, in order for such positional adjustments to occur, each shaft 26 is either slightly tapered or undersized relative to each bore 30. However, this taper or undersizing is not shown in the drawings, since it is no more than a few thousandths of an inch. This very slight rocking motion is just sufficient to permit the adjustment necessary to help relieve undesirably unbalanced loading of the combination gears.

Attention is called to the fact that the mounting arrangement of the invention is not spherical. That is, it does not allow adjustment in all directions. Instead, this cylindrical mounting arrangement intentionally limits the permitted positional adjustment motion of each combination gear 20 to a plane perpendicular to axis 15 of side gears 18, 18'. A spherical mounting could result in relative motion between a combination gear 20 and its associated side gear 18, 18' which might be quite detrimental to the meshing contact pattern shared by the worm-wheel portion 22 of the combination gear and the worm teeth of the side gear. Limitation of the motion to a plane perpendicular to axis 15, in effect, merely rolls the combination gear around the circumference of the side gear and does not significantly affect the contact pattern.

While the preferred embodiment places the mating cylindrical surfaces, respectively, on the housing and on one side of a mounting washer, other arrangements are possible as well. These surfaces may be formed on the outer end of the combination gear and on the inner surface of the washer, or the washer may be omitted and a cylindrical surface on the outer end of the combination gear can cooperate with a mating surface formed in the housing.

I claim:

1. In a differential assembly of the type which includes a differential case having means for receiving a pair of axle ends each of which is fixed to a respective side gear for rotation therewith about a common axis, said case also having means for supporting at least one pair of combination gears so that each respective one of said paired combination gears is in meshing engagement with a respective one of said side gears and so that said paired combination gears are also in meshing engagement with each other for interconnecting said side gears and their respective axle ends in a mutual driving relationship, the improvement wherein said supporting means for at least one combination gear of each said pair further comprises cylindrical mounting means for permitting said combination gear to be positionally adjusted in said mounting only about an axis parallel to the axis of the respective side gear with which it is in meshing engagement.

2. The improvement of claim 1 wherein both combination gears of each said pair are supported in cylindrical mounting means for permitting each gear of the pair to be positionally adjusted only about an axis parallel to the axis of the respective side gear with which it is in meshing engagement.

3. The improvement of claim 1 wherein said cylindrical mounting comprises a washer having a first surface in contact with one end of said combination gear and a second surface which contacts said differential case, one of said washer surfaces having a cylindrical shape for cooperating with a mating cylindrical surface formed on one of said combination gears and said differential cases, said cylindrical surfaces having a common axis parallel to the axis of the side gear with which said combination gear is in meshing engagement.

4. The improvement of claim 3 wherein said cylindrical washer surface cooperates with a mating cylindrical surface formed on said differential case.

* * * * *